US012670601B2

(12) United States Patent
Lee et al.

(10) Patent No.: US 12,670,601 B2
(45) Date of Patent: Jun. 30, 2026

(54) ELECTRONIC DEVICE INCLUDING CAMERA AND METHOD FOR GENERATING VIDEO RECORDING OF A MOVING OBJECT

(71) Applicant: Samsung Electronics Co., Ltd., Suwon-si (KR)

(72) Inventors: Bohee Lee, Suwon-si (KR); Sungoh Kim, Suwon-si (KR); Jiyoon Park, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 492 days.

(21) Appl. No.: 18/121,324

(22) Filed: Mar. 14, 2023

(65) Prior Publication Data

US 2023/0215018 A1 Jul. 6, 2023

Related U.S. Application Data

(63) Continuation of application No. PCT/KR2023/000162, filed on Jan. 4, 2023.

(30) Foreign Application Priority Data

Jan. 6, 2022 (KR) ......................... 10-2022-0002217

(51) Int. Cl.
G06T 7/20 (2017.01)
G06T 3/40 (2006.01)
(Continued)

(52) U.S. Cl.
CPC .................. *G06T 7/20* (2013.01); *G06T 3/40* (2013.01); *G06T 5/70* (2024.01); *G06T 7/70* (2017.01);
(Continued)

(58) Field of Classification Search
None
See application file for complete search history.

(56) References Cited

U.S. PATENT DOCUMENTS 6,252,975 B1 * 6/2001 Bozdagi ................. G06V 20/40
707/E17.028
7,146,022 B2 12/2006 Masukura et al.
(Continued)

FOREIGN PATENT DOCUMENTS

CN 101119442 A * 2/2008
EP 3297272 A1 3/2018
(Continued)

OTHER PUBLICATIONS

International Search Report and Written Opinion for International Application No. PCT/KR2023/000162; International Filing Date Jan. 4, 2023; Date of Mailing Apr. 4, 2023; 50 Pages.
(Continued)

*Primary Examiner* — Andrew W Bee
*Assistant Examiner* — Christine Zhao
(74) *Attorney, Agent, or Firm* — CANTOR COLBURN LLP

(57) ABSTRACT

An electronic device includes a display, a memory and a processor. The memory includes instructions for causing the processor to, when generating a video, receive a video signal including an object to obtain a plurality of frame images having a first size, estimate a movement trajectory of the object included in the plurality of frame images, stitch together frame images in which overlapping portions of the video signal are arranged to overlap according to the movement trajectory of the object to generate a stitched image having a second size larger than the first size; and store the generated stitched image and the plurality of frame images as a video file.

20 Claims, 10 Drawing Sheets

(51) Int. Cl.
    *G06T 5/70*     (2024.01)
    *G06T 7/70*     (2017.01)
    *G06V 10/10*    (2022.01)

(52) U.S. Cl.
    CPC .... *G06V 10/16* (2022.01); *G06T 2207/30241*
    (2013.01)

(56)                References Cited

U.S. PATENT DOCUMENTS

| | | | | |
|---|---|---|---|---|
| 10,440,313 | B2 * | 10/2019 | Dodballapur | ........... G06T 7/254 |
| 10,785,387 | B2 | 9/2020 | Kim et al. | |
| 11,102,418 | B2 | 8/2021 | Shimokawa et al. | |
| 2009/0219300 | A1 | 9/2009 | Peleg et al. | |
| 2010/0201830 | A1 * | 8/2010 | Hosoda | ................ H04N 5/4448 |
| | | | | 348/220.1 |
| 2013/0215291 | A1 | 8/2013 | Baek et al. | |
| 2016/0062563 | A1 * | 3/2016 | Park | ..................... G11B 27/031 |
| | | | | 715/723 |
| 2016/0232234 | A1 | 8/2016 | Baek et al. | |
| 2016/0381291 | A1 | 12/2016 | Han et al. | |
| 2017/0237901 | A1 | 8/2017 | Lee et al. | |
| 2017/0293998 | A1 | 10/2017 | Kim et al. | |
| 2018/0255211 | A1 | 9/2018 | Kniffen et al. | |
| 2019/0166299 | A1 | 5/2019 | Kitagawa | |
| 2019/0340771 | A1 | 11/2019 | Keskikangas et al. | |

FOREIGN PATENT DOCUMENTS

| | | | |
|---|---|---|---|
| JP | 2001251627 | A * | 9/2001 |
| KR | 20110002922 | A | 1/2011 |
| KR | 20140011964 | A | 1/2014 |
| KR | 20180090695 | A | 8/2018 |
| KR | 101921935 | B1 | 11/2018 |
| KR | 20190101115 | A | 8/2019 |
| KR | 102375864 | B1 | 3/2022 |

OTHER PUBLICATIONS

European Extended Search Report corresponding to Application No. 23737377.4-1207 / 4395357 PCT/KR2023000162; Dated Feb. 13, 2025.

Soonmin Bae et al: "Building a Videorama with Shallow Depth of Field", 2010 20th International Conference on Pattern Recognition (ICPR 2010): Istanbul, Turkey, Aug. 23-26, 2010, IEEE, Piscataway, NJ, USA, Aug. 23, 2010 (Aug. 23, 2010), pp. 420-423, XP031772756,ISBN: 978-1-4244-7542-1.

Yu Jiyang et al: "Selfie Video Stabilization", IEEE Transactions on Pattern Analysis and Machine Intelligence, IEEE Computer Society, USA, vol. 43,No. 2, Jul. 30, 2019 (Jul. 30, 2019), pp. 701-711, XP011830029, ISSN: 0162-8828,DOI: 10.1109/TPAMI.2019. 2931897.

* cited by examiner (4001)

(4002)

Device motion

Object motion

610

(6001)

610    620-1    620-2

Device motion

FIRST POSITION

SECOND POSITION
Local motion (N-1)th Frame (N)th Frame (6002)

(6003)

(6004)

ELECTRONIC DEVICE INCLUDING CAMERA AND METHOD FOR GENERATING VIDEO RECORDING OF A MOVING OBJECT

CROSS-REFERENCE TO RELATED APPLICATIONS

This application is a continuation of International Application No. PCT/KR2023/000162 designating the United States, filed on Jan. 4, 2023, in the Korean Intellectual Property Receiving Office and claiming priority to Korean Patent Application 10-2022-0002217, filed on Jan. 6, 2022, at the Korean Intellectual Property Office, the disclosures of which are incorporated by reference herein in their entireties.

TECHNICAL FIELD

Various embodiments relate to an electronic device including a camera and a method for generating a video recording of a moving object.

BACKGROUND ART

An electronic device (e.g., a smartphone) provides a function of recording images by using at least one camera (e.g., a camera module and an image sensor). Recently, as the number of users who record images with a camera of an electronic device increases, various camera performances are also improved.

For example, the electronic device supports a panorama function for generating one wide-range image (e.g., a panoramic image) by combining a plurality of recorded frame images (or still images) in addition to the function to record with various angles of view (or magnification).

However, in such a panoramic recording technique, because the recording is continuously performed while the recording direction is changed at various angles but still images are connected as one image, it is difficult to record the moving situation of the subject.

Alternatively, the technique of saving and playing the subject with a moving effect (e.g., motion panorama function) using still images is to save the recorded images to be played back in the form of a video, so the technique may be a different recording technique from video recording in which audio is recorded.

DISCLOSURE

Technical Problem

Users use a video recording function to record a moving subject. However, when recording an image using an electronic device, a camera angle of view (in other words, a field of view of a scene captured by the camera) has a limit, so there is a limit in recording a scene desired by a user. For example, the electronic device may support magnifications such as ×1, ×2, ×10, ×50, and ×100 when taking a picture or still image, while only supporting a magnification according to a supportable resolution when taking a video.

For example, when an image of a distant moving subject is desired to be recorded, the user may record the subject by adjusting a camera magnification (e.g., zoom expansion) according to the subject. In this case, the subject may be enlarged and recorded, but it may be difficult to record the moving trajectory of the subject as a video because the entire background is excluded from the angle of view of the camera.

On the other hand, when a distant subject is recorded without increasing the magnification of the camera, image quality (or resolution) may be deteriorated, so it may be difficult to accurately recognize the subject. In addition, while the size of the subject is large even when recording a close subject, it may be difficult to record a scene representing the movement trajectory of the subject because it is difficult to record the background due to a narrow angle of view.

Various embodiments may provide a method for generating a video as a scene having a larger range (or a wider range) than a limited camera angle of view while recording the scene indicating the moving trajectory of the subject in a more stable state when recording the moving subject.

Technical Solution

In accordance with an aspect of the disclosure, an electronic device is provided. An electronic device comprises a display, a memory and a processor, wherein the memory comprises instructions for causing the processor to, when generating a video, receive a video signal including an object to obtain a plurality of frame images having a first size, estimate the movement trajectory of the object included in the plurality of frame images, stitch the frame images in which overlapping portions of the video signal are arranged to overlap according to the movement trajectory of the object to generate a stitched image having a second size larger than the first size; and store the generated stitched image and the plurality of frame images as a video file.

In accordance with another aspect of the disclosure method of generating a video by recording a moving object of an electronic device, the method comprising receiving a video signal including an object to obtain a plurality of frame images having a first size, when recording a video, estimating the movement trajectory of the object included in the plurality of frame images, generating a stitched image having a second size larger than the first size by stitching the frame images in which overlapping portions of the video signal are arranged to overlap according to the movement trajectory of the object; and storing the generated stitched image and the plurality of frame images as a video file, wherein in the storing, the plurality of frame images are stored to be played based on the generated stitched image.

Advantageous Effects

An electronic device according to various embodiments can store images and generate a video having a wide range of scenes so as to effectively show a moving trajectory of a moving subject in recording the moving subject.

The electronic device according to various embodiments can generate a video with a stabilized trajectory by removing a noise component of a moving subject, and may record the image so that the image is smoothly connected.

The electronic device according to various embodiments can be effectively applied to a portable electronic device by processing images in real-time frame by frame, and adjusting and storing the size of the image data, even when generating a video having an angle of view larger than the size of the limited angle of view.

MODE FOR INVENTION

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 1:
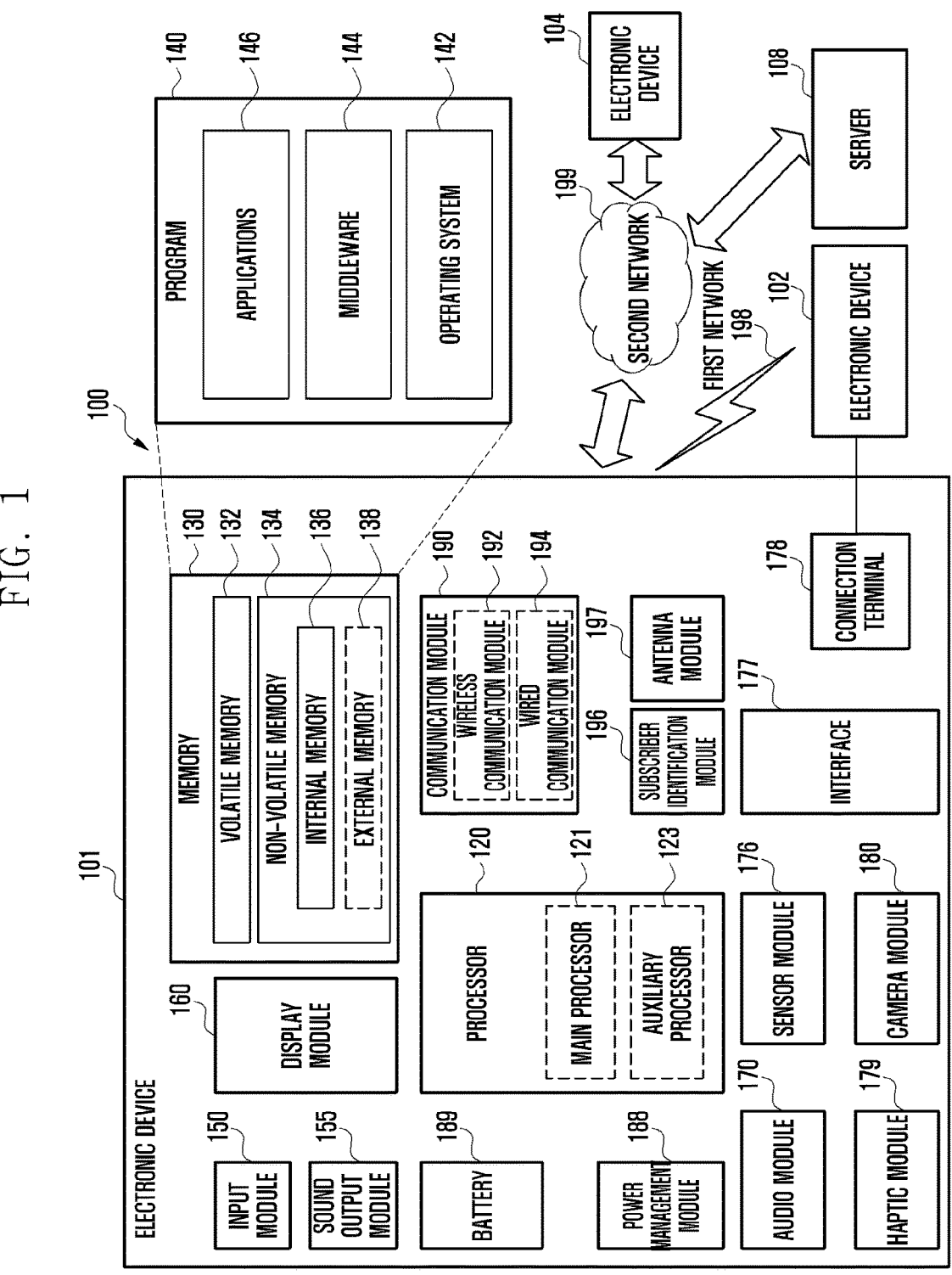
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device. 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen.

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101, The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa, According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HMV, a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device. 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication (nodule 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 50 network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 50 network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 19:2 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 10:2 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device

104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
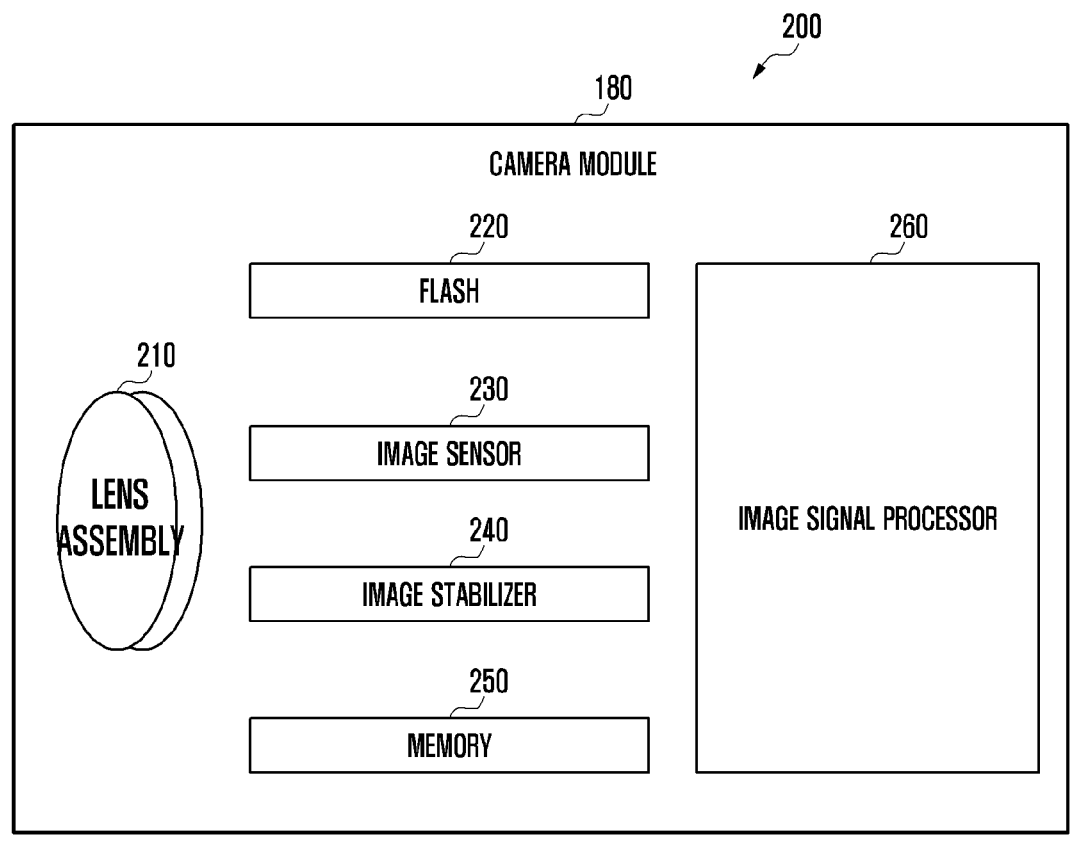
FIG. 2 is a block diagram illustrating a camera module according to various embodiments.

FIG. 2 is a block diagram 200 illustrating the camera module 180 according to various embodiments.

Referring to FIG. 2, the camera module 180 may include a lens assembly 210, a flash 220, an image sensor 230, an image stabilizer 240, memory 250 (e.g., buffer memory), or an image signal processor 260.

The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured.

According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180.

According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

According to various embodiments, the electronic device 101 may support a function (e.g., panorama video function) of recording a video having an angle of view that is greater than an angle of view supported by the camera when recording a video.

According to various embodiments, the electronic device (e.g., an electronic device 101 of FIG. 1) may include a display (e.g., a display module 160 of FIG. 1), a memory (e.g., a memory 130 of FIG. 1), and a processor (e.g., a processor 120 of FIG. 1), and the memory 130 may include instructions, when recording a video, for causing the processor 120 to receive a video signal including an object to obtain a plurality of frame images having a first size, estimate the movement trajectory of the object included in the plurality of frame images, stitch the frame images in which overlapping portions of the video signal are arranged to overlap according to the movement trajectory of the object to generate a stitched image having a second size larger than the first size, and store the generated stitched image and the plurality of frame images as a video file.

According to various embodiments, the memory 130 may further include instructions configured to cause the processor 120 to store the frame images to be played, based on the generated stitched image, and call the stitched image of the second size to the display when playing the video file, the display data of the stitched image being generated using pixel data of the frame images.

According to various embodiments, the memory may further include instructions configured to cause the processor to identify a distance according to a movement trajectory of the object and predict the size of the stitched image when frame images are synthesized according to the movement trajectory, and scale the frame images to fit the size of the stitched image.

According to various embodiments, it is characterized in that the stitched image may be an image obtained by arranging the plurality of frame images in a two-dimensional or three-dimensional space, and stitching overlapping portions of adjacently arranged frame images.

According to various embodiments, it is characterized in that the stitched image may be generated in a size having four vertices where the outermost boundary lines of frame images in which parts having the same image signal among the frame images are arranged in an overlapping form in a two-dimensional image are extended and met.

According to various embodiments, the memory 130 may further include instructions configured to cause the processor 120 to extract the motion vector of the object motion according to the position of the object for each frame image, verify whether the motion vectors are valid, identify validated object motions based on the verified motion vector, and estimate the movement trajectory by connecting the validated object motions.

According to various embodiments, the memory 130 may further include instructions configured to cause the processor 120 to calculate the amount of change of a motion vector corresponding to the motion of the object corresponding to the movement of the object, and determine whether the amount of change is equal to or greater than a set threshold to verify validity, for each frame image.

According to various embodiments, the memory 130 may further include instructions configured to cause the processor 120 to exclude motion vector data of the invalid object motion and generate replacement data to replace the invalid object motion, when it is determined that the object motion is invalid, as a result of the validation, and estimate the movement trajectory of the object, based on the data verified as the valid object motion and the replacement data.

According to various embodiments, the memory 130 may further include instructions configured to cause the processor 120 to perform trajectory smoothing with the object motion in which the movement trajectory is smoothed by removing small shake data of the movement trajectory.

According to various embodiments, the memory 130 may further include instructions configured to cause the processor 120 to calculate a correction value for scaling the size of all frame images according to the size of the stitched image, and scale the size of all frame images by applying the correction value.

Figure 3:
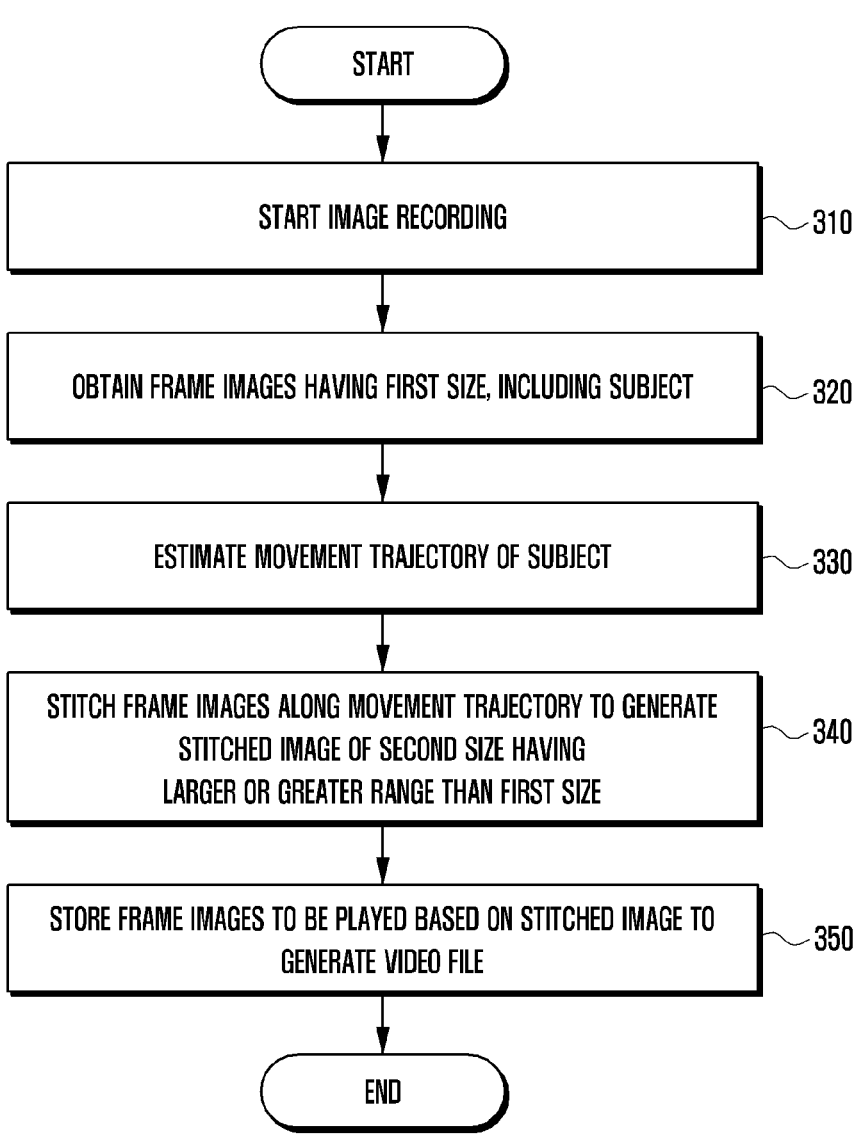
FIG. 3 shows a video generation method of recording a moving object of an electronic device according to various embodiments.
Figure 4:
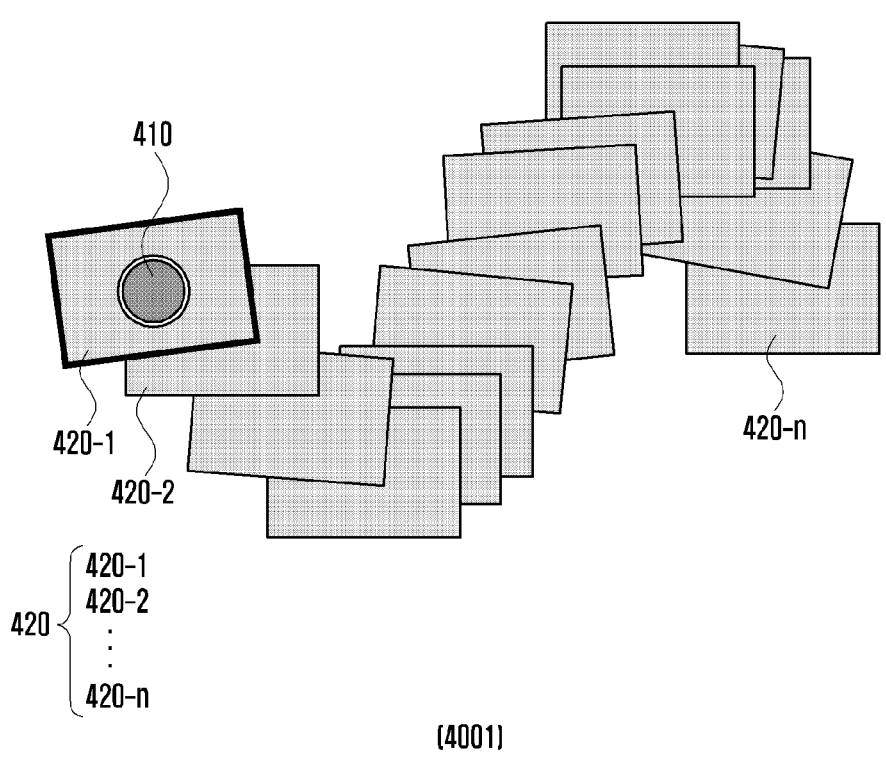
FIG. 4 shows an example of frame images and stitched images according to an embodiment.
Figure 4:
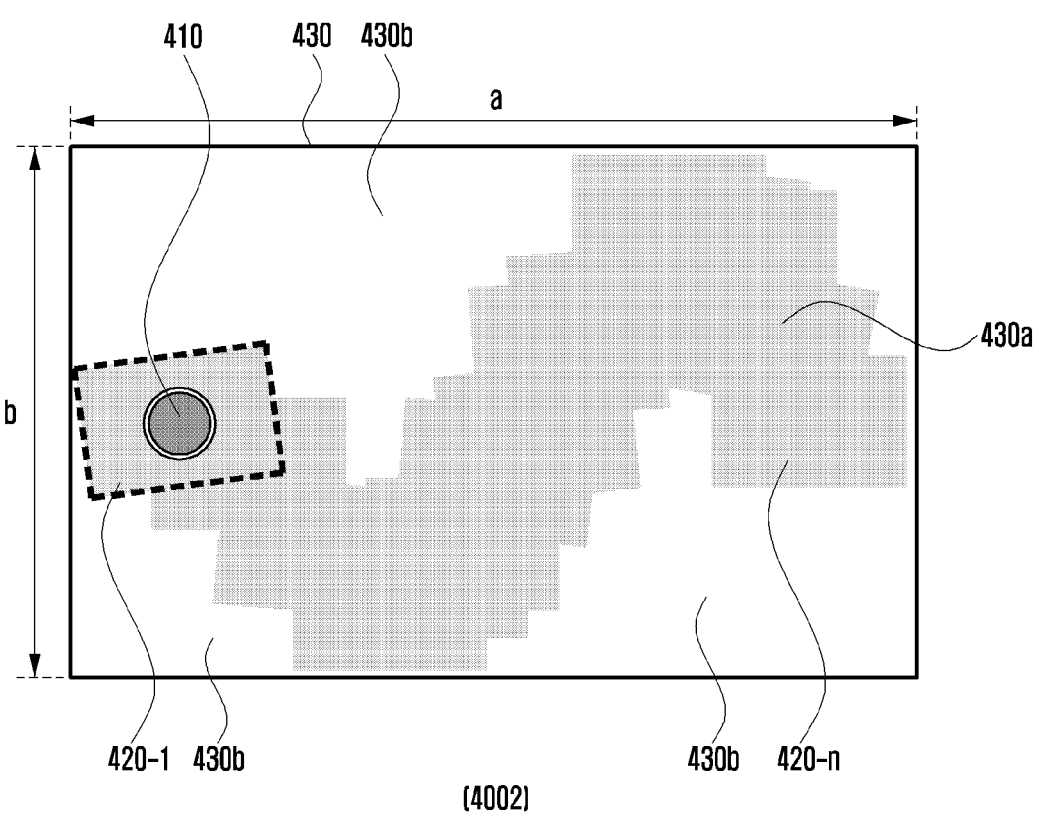

FIG. 3 shows a video generation method of recording a moving object of an electronic device according to various embodiments, and FIG. 4 shows an example of frame images and stitched images according to an embodiment.

Referring to FIGS. 3 and 4, the processor 120 of the electronic device 101 according to an embodiment may activate a camera to start recording a video in operation 310.

In operation 320, the processor 120 may receive an image signal (e.g., pixel data) including an object (e.g., a subject (e.g., the subject 410 in FIG. 4)) from at least one camera or an image sensor included in the camera to obtain a plurality of frame images (hereinafter, may be referred to as a captured image or a raw image) (e.g., frame images 420 of FIG. 4) having a first size in response to the start of video recording.

The first size may be a size corresponding to a frame angle of view (or recording range) set for image recording. The frame angle of view may correspond to the zoom factor information of the camera lens.

The frame images 420 may refer to data before being scaled to a display size set in the display (e.g., the display device 160 of FIG. 1), and may be temporarily stored in the memory (e.g., a buffer) in units of frames.

The processor 120 may arrange the frame images for each frame according to the received order based on the received image signal. The frame images 420 may be referred to as frame image 1 (420-1), frame image 2 (420-2), etc., up to frame image n (420-n) according to the order of time. The above-described example is set in the order of increasing numbers according to the order of time, but is not limited thereto, and may be set in the reverse order or in any order. The frame images 420 stored in units of frames may include time information (e.g., time stamp) for each frame.

In operation 330, the processor 120 may estimate the movement trajectory of the subject 410 included in the plurality of frame images 420.

According to an embodiment, the processor 120 may estimate the movement trajectory of the subject by performing an object motion estimation operation, a validation operation, and a trajectory calculation operation.

The object motion estimation may be an operation of analyzing the motion of the subject 410 and extracting motion vectors (e.g., direction and magnitude values) corresponding to the position of the subject 410.

The validation operation may be an operation of determining whether a motion vector estimated by the motion of the subject 410 is valid. For example, the processor 120 may calculate the change amount of the pixel value corresponding to the movement of the subject 410 for each frame image, determine whether the change amount is equal to or greater than a set threshold value, and verify whether the change amount is valid. That is, when the change amount is equal to or greater than the set threshold value, the change amount is determined to be valid.

The trajectory calculation may be an operation of calculating the movement trajectory of the subject 410 by connecting the motion vector according to the position of the subject 410 in the plurality of frame images 420 by reflecting the validation result. For example, the processor 120 may arrange the frame images 420 in a three-dimensional space, and calculate a movement trajectory by connecting the motion vectors of each subject 410 in the frame images 420 arranged in a three-dimensional space.

According to various embodiments, the processor 120 may predict the size of an image (e.g., a stitched image) synthesized by stitching the frame images 420 based on the movement trajectory of the subject 410.

In operation 340, the processor 120 may generate a stitched image 430 having a second size having a range larger than the first size by stitching frame images according to the movement trajectory of the subject.

The processor 120 may generate the stitched image 430 by performing a stitching size prediction, a trajectory smoothing operation, and a scaling operation.

The stitching size prediction may be an operation of identifying the distance according to the movement trajectory of the subject 410 included in the frame images 420 collected over time, and predicting the size of a stitched image when the frame images 420 are stitched and synthesized according to a movement trajectory.

The trajectory smoothing (or may be referred to as a trajectory stabilization operation) may be an operation of generating a smoothing movement trajectory by removing small shake (or shake) data in order to smooth the movement trajectory of the subject 410.

The scaling operation may be an operation of scaling the sizes of all frame images 420 according to the size of the stitched image 430.

In <4001> of FIG. 4, the frame images 420 may be arranged in overlapping form with portions having the same image signal (that is, pixel data), and may start at frame image 1 (420-1) and end at frame image (420-n) in time series.

In <4002> of FIG. 4, a stitched image 430 synthesized by stitching frame images 420 arranged according to the movement trajectory of the subject 410 as in FIG. 4 is illustrated. The stitched image 430 is generated in the size of the display area displayed on the display, and may have a width (a) and a height (b).

For example, the stitched image may have a size having four vertices that extend and meet the outermost boundary lines of frame images in which parts having the same image signal (that is, pixel data) among the frame images are arranged in a superimposed two-dimensional image (e.g., plane).

The stitched image 430 may include a frame area 430a having pixel data by stitching the frame images 420 (that is, a portion arranged in frame images) and a blank area where no image signal is collected (or a dark region) 430b.

According to an embodiment, the processor 120 may fill the display data of the blank region 430b based on the pixel data of the frame region 430a based on a boundary line between the blank region 430b and may generate a stitched image in which the blank area 430b is filled.

In operation 350, the processor 120 may generate an image file (or a panoramic video) by storing the frame images 420 to be reproduced, based on the stitched image 430.

According to an embodiment, the processor 120 may generate an image file by compressing and storing the frame images 420 and the at least one stitched image 430 into one image file.

According to an embodiment, the processor 120 may place the stitched image 430 in the first frame (e.g., frame image 1 (420-1)) or the last frame (e.g., frame image n (420-n)) of the frame images 420, and then may store the frame images 420.

According to an embodiment, the processor 120 may generate a plurality of stitched images, compress and store the plurality of stitched images into a single image file to generate an image file. For example, the processor 120 generates a first stitched image with frame images (e.g., frame images 1 and 2 (420-1 and 420-2)) collected at every set time, generate a second stitched image with the re-collected frame images (e.g., frame images 3 and 4 (420-3 and 420-4)), post-process overlapping portions in a plurality of generated stitched images, and then generate one image file.

According to one embodiment, the processor 120 may store position information of the stitched image 430, a motion vector of each frame image 420, and a correction value (or scale value) of each frame image 420 matching the stitched image 430 as metadata in the image file, in addition to the frame images 420 and the stitched image 430.

According to an embodiment, the processor 120 may store the stitched image 430 to be called on the display, based on the image reproduction, and generate display data of the stitched image 430 using pixel data of the frame images 420.

The electronic device 101 may display the stitched image 430 on the display when the image file is reproduced.

Figure 5:
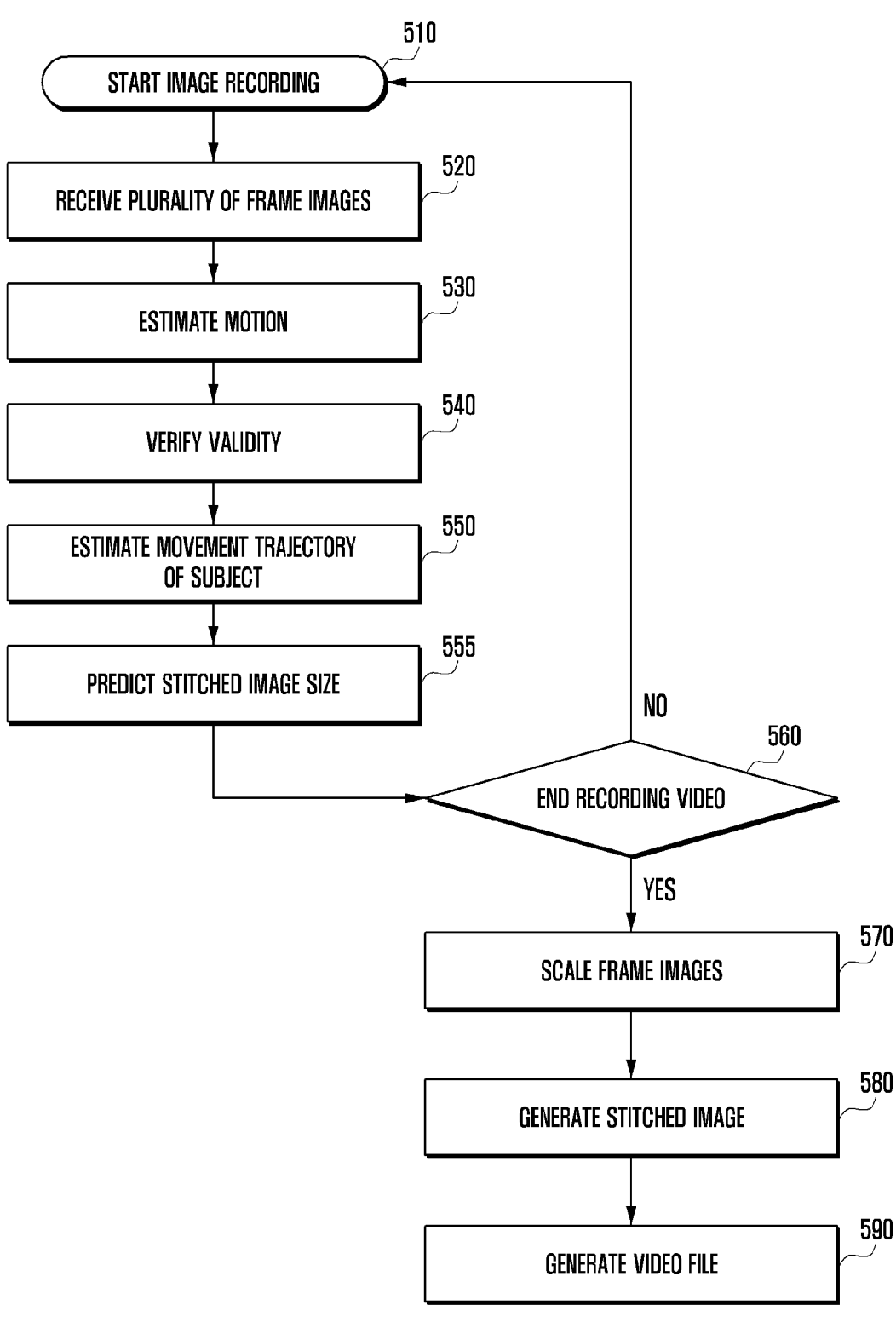
FIG. 5 shows a video generation method of capturing a moving object of an electronic device according to various embodiments.
Figure 6A:
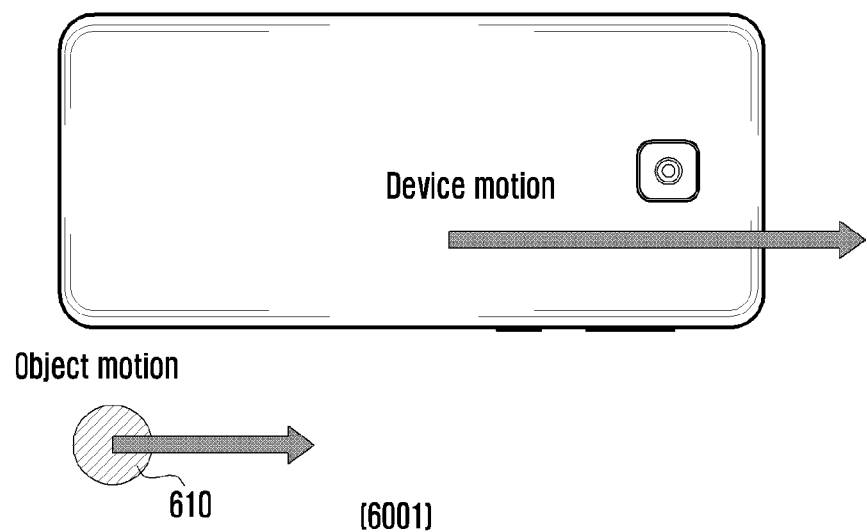
FIG. 6A shows motions of an electronic device and a moving object.
Figure 6A:
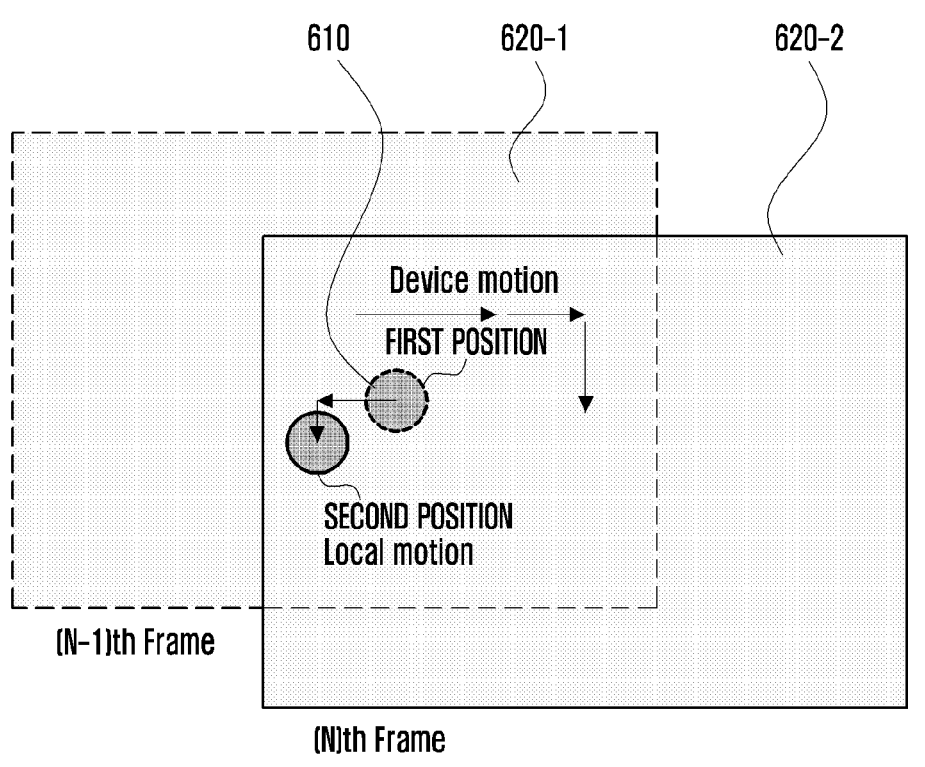
Figure 6B:
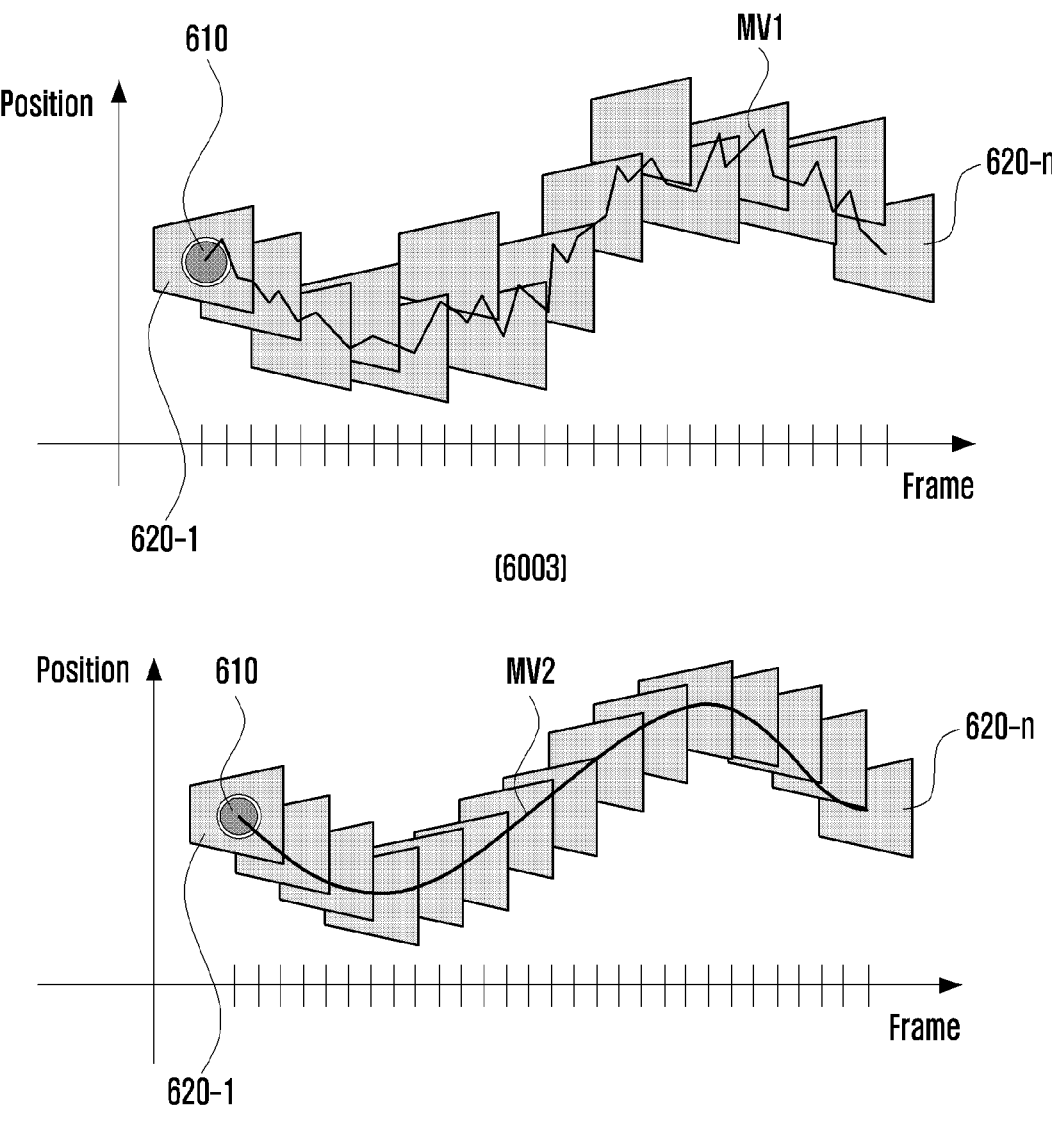
FIG. 6B shows an example of smoothing a motion trajectory of a moving object.
Figure 6C:
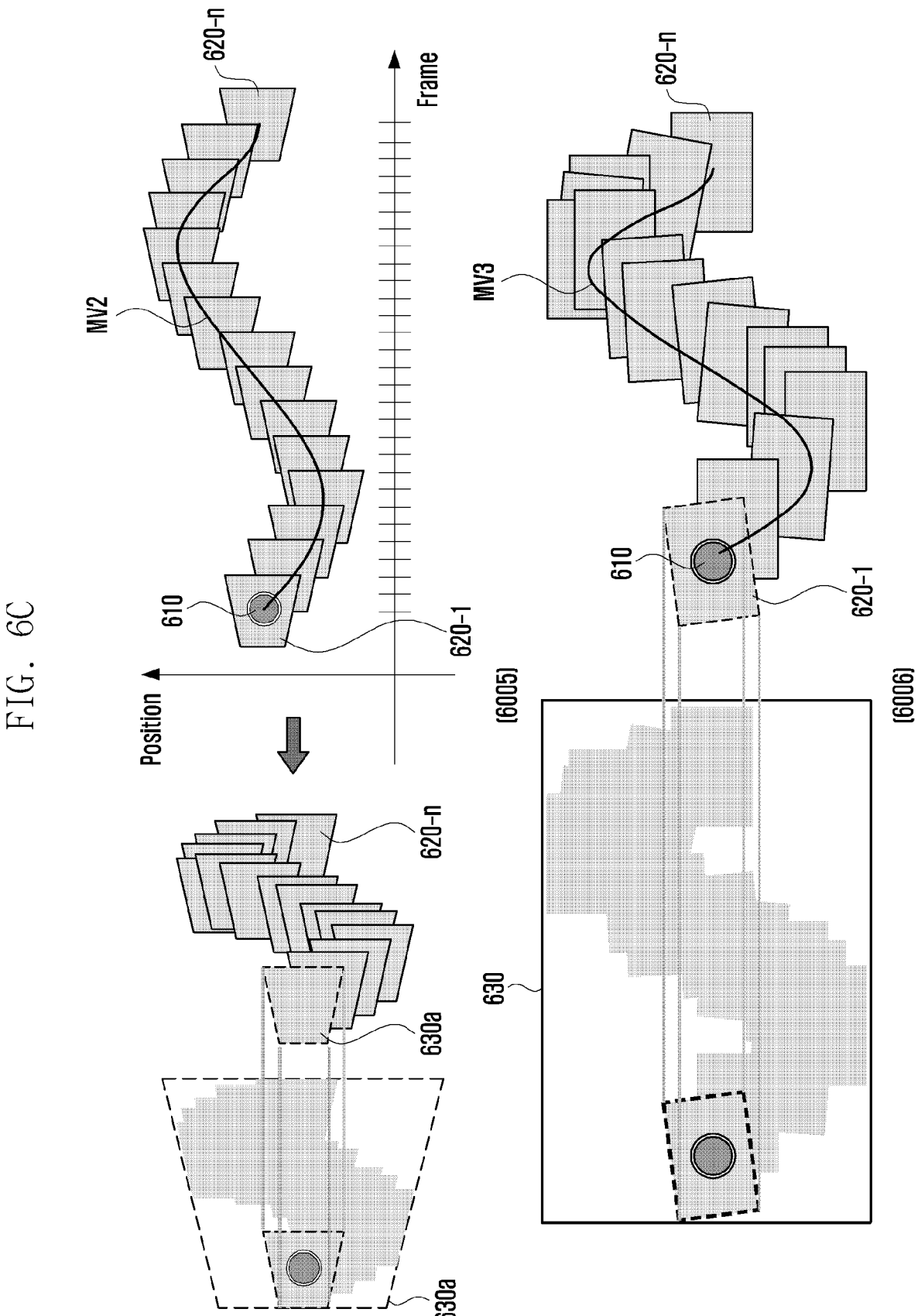
FIG. 6C shows an example of stitched image synthesis.

FIG. 5 shows a video generation method of capturing a moving object of an electronic device according to various embodiments, FIG. 6A shows motions of an electronic device and a moving object, FIG. 6B shows an example of smoothing a motion trajectory of a moving object, and FIG. 6C shows an example of stitched image synthesis.

Referring to FIG. 5, a processor 120 of the electronic device 101 according to an embodiment may activate a camera to start recording a video, in operation 510.

In an embodiment, the electronic device 101 may support a function of recording an image having an angle of view larger than that supported by the camera when recording an image (e.g., a panoramic video function), and when such a function is selected, the process of FIG. 5 may be started.

In operation 520, in response to a request to start image recording, the processor 120 may receive an image signal (e.g., pixel data) including a moving object (e.g., a subject (e.g., the subject 410 in FIG. 4)) from at least one camera or an image sensor included in the camera to obtain a plurality of frame images having a first size (hereinafter, may be referred to as a captured image or a raw image).

The first size may be a size corresponding to a frame angle of view (or recording range) set for image capturing. The frame angle of view may correspond to the zoom factor information of the camera lens.

The frame images may mean data before being scaled to a display size set in a display (e.g., the display device 160 of FIG. 1), and may be temporarily stored in a memory (e.g., a buffer) in units of frames.

The processor 120 may arrange the frame images for each frame according to the received order based on the received image signal. The frame images may be referred to as frame image 1, frame image 2 . . . , etc., and frame image n in chronological order. The above-described example is set in the order of increasing numbers according to the order of time, but is not limited thereto, and may be set in the reverse order or in any order. The frame images stored in units of frames may include time information (e.g., time stamp) for each frame.

As another example, when the electronic device 101 includes a plurality of cameras, the processor 120 may obtain a plurality of frame images by combining image signals obtained from the plurality of cameras.

According to an embodiment, the processor 120 may process the collected frame images into an image signal (e.g., resizes) to generate a preview image (hereinafter, may be referred to as a display image) scaled to a display size of the display, and display the same on the display.

The user may identify the subject being recorded through the preview image. When the zoom magnification of the preview image is adjusted, the angle of view of the frame images may be adjusted and the first size may be changed.

In operation 530, the processor 120 may perform object motion estimation (i.e., a process of calculating a moving distance of a subject in a real area through a subject spanning a plurality of frame images), based on a subject included in the plurality of frame images.

According to an embodiment, before performing the motion estimation operation, the processor 120 may identify a moving object (hereinafter, referred to as a subject) according to a user selection or a set criterion. For example, when the user designates a region of interest (or focusing region) including a subject, the processor 120 may identify the subject. For another example, the processor 120 may recognize an object, such as a person, an animal, or an object, and identify it as a subject.

The processor 120 may analyze the movement (or change information of specific points) of a subject identified over a plurality of frame images through an optical flow motion estimation method, and extract the same as a motion vector (e.g., a direction and a magnitude value). The motion estimation method may be calculated using a difference in change of a histogram, a difference in edge change, and/or a difference between frames, or may be estimated based on other criteria. Because the motion estimation method is a known technique, a detailed description thereof will be omitted, and any known or to be developed techniques for motion estimation may be used in addition to the above-described method(s).

In relation to motion estimation, when recording a moving subject through the electronic device (or camera), the electronic device 101 may also move along with the moving subject separately from the movement of the subject. For example, when it is assumed that the electronic device 101 and the subject 610 move as in <6001> of FIG. 6A, the amount of movement of the electronic device 101 may be defined as a device motion (or global motion), and the amount of movement of the subject 610 in an actual area may be defined as an object motion.

In this case, because the motion (e.g., device motion) of the electronic device 101 during image recording is greater than the object motion of the subject 610 moving in the real area when capturing an image (indicated by the size of the arrows illustrated in view <6001>), the motion of the subject 610 shown on the frame images may be divided into a local motion and a device motion.

For example, as shown in <6002> of FIG. 6A, when the subject 610 moves from the first position to the second position between the frame images n−1 (620-1 or (N−1)th Frame) and the frame images n (620-2 or (N)th Frame), the electronic device 101 may calculate the local motion and the device motion within the camera area. The local motion may refer to the movement of frames due to the difference between frame images within the camera area, and the device motion may refer to the motion of the ROI (region of interest) including the subject in the camera area. According to an embodiment, the processor 120 may calculate a device motion (e.g., posture information or direction information), based on information obtained from a sensor module (e.g., a gyro sensor or an accelerator sensor) of the electronic device 101. The device motion may be a value measured through a sensor module. The processor 120 may perform the calculation through image processing.

The processor 120 may calculate (or backtrack) the object motion of the moving subject using difference data (e.g., object motion=device motion−local motion) between a device motion representing the motion of the electronic device 101 and a local motion of a moving subject. The object motion may refer to the amount of movement of the subject 610 in the real area, and may be a calculated value that the electronic device 101 traces back to obtain the movement trajectory of the subject 610 in the real area.

According to some embodiments, because shaking of the electronic device may affect detection of a local motion, the processor 120 may obtain an object motion by performing compensation processing for the motion of the global motion.

In operation 540, the processor 120 may perform validity verification of the motion vector for a subject calculated by object motion estimation for each frame image.

The processor 120 may process or perform an operation for determining whether the movement of the subject 410 included in each frame image is valid.

In an example of the validity verification, the processor 120 may calculate a change amount of a motion vector corresponding to an object motion corresponding to the movement of a subject for each frame image, determine whether the change amount is equal to or greater than a set threshold value, and verify whether the change amount is valid.

The processor 120 may exclude (or drop) an invalid motion vector and generate replacement data (e.g., an alternative motion vector) to replace the invalid motion vector. For example, the processor 120 may generate replacement data, based on a frame image including an invalid motion vector and frame images having continuity in time series (e.g., a motion vector of a previous frame frame). For another example, the processor 120 may generate replacement data using a device motion or an average value of motion vectors of frames. As such, in some embodiments, the data representative of the movement trajectory of the subject may be a combination of valid (i.e., verified) object motion data and replacement data that is generated to replace or substitute for invalid object motion data.

In operation 550, the processor 120 may calculate or estimate the movement trajectory of the subject.

According to an embodiment, the processor 120 may calculate or estimate the movement trajectory of the subject based on the valid object motion and replacement data.

In operation 555, the processor 120 may predict the size of an image (e.g., a stitched image) synthesized by stitching the frame images 420 based on the movement trajectory of the subject 410.

According to an embodiment, the processor 120 may identify the distance according to the movement trajectory of the subject 410 included in the frame images 420 collected over time, and may process an operation of predicting a size of a stitched image when the frame images 420 are stitched and synthesized according to a movement trajectory.

Here, the stitched image may have a size having four vertices where the outermost boundary lines of frame images in which parts having the same image signal (i.e., pixel data) among the frame images are arranged in an overlapping form in a two-dimensional image (e.g., plane) are extended and met. The processor 120 may predict a width (a) and a height (b) of the stitched image (e.g., as shown in FIG. 4).

The size prediction of the stitch image may be changed each time the collected frame images are accumulated.

On the other hand, when the size of the stitched image is gradually increased as frame images are collected indefinitely, there may be a problem in that the size of data is changed to a large capacity when generating an image file. By predicting the size of the stitched image, the electronic device may support a function in which the processor flexibly responds so that the data size of a future video image (e.g., including a second image generated based on the first images) does not have a capacity greater than or equal to a threshold.

According to an embodiment, when it is predicted that the data size of the image file exceeds a value set as a limit as the size of the stitched image increases, the electronic device 101 may display guide information for guiding the end of image capturing due to data size limitation on a display (e.g., a recording screen).

In operation 560, the processor 120 may determine whether an image capturing end request is received.

According to an embodiment, operation 560 may be changed to a position between operation 520 and operation 530, and after operation 520, an image recording end request may be received. In this case, operations 530 to 550 may be performed at the end of image recording.

In operation 570, the processor 120 may scale all frame images based on the size of the stitched image.

According to an embodiment, although not shown in the drawing, before scaling (or changing) the size of all frame images according to the size of the stitched image, trajectory smoothing the moving trajectory of the subject (or trajectory stabilizing processing) may be performed.

For example, when trajectory smoothing, the processor 120 may remove jitter data from the accumulated movement trajectory of the subject, based on a difference between frames and obtain a smoothing motion vector. The trajectory smoothing may use at least one of a video digital image stabilizer (VDIS) method, a low pass filter (LPF) method, and an average filter method.

For example, FIG. 6B lists frame images 620-1 and 620-$n$ in chronological order, and shows positions and movement trajectories of subjects included in each frame image. View <6003> of FIG. 6B represents a movement trajectory MV1 in which the frame images 620-1 and 620-$n$, collected during video shooting, are arranged in a three-dimensional form, and motion vectors of the subject 610 included in the frame image N (620-$n$) from the frame image 1 (620-1) are connected. In the movement trajectory of MV1 view <6003>, it can be seen that the movement trajectory of the subject is not smooth.

The processor 120 may remove and correct the blur data from the movement trajectory MV1 that connects the motion vectors of the subject 610 to obtain a movement trajectory MV2 having a smoothing motion vector as shown in view <6004> of FIG. 6B.

The processor 120 may identify a size of a stitch image according to a movement trajectory MV2 having a smoothing motion vector, and scale all frame images according to the stitched image.

According to an embodiment, the processor 120 may calculate a correction value (or scale value) for scaling the size of all frame images according to the size of the stitched image (e.g., a width (WIDTH) and a height value), and scale the sizes of all frame images by applying a correction value.

For example, view <6005> of FIG. 6C represents frame images 620-1 to 620-$n$ arranged in a 3D space along a motion vector MV2 having a smoothing motion vector of the subject 610. Screen or image 630$a$ may be a screen in which overlapping portions of the frame images 620-1 to 620-$n$ arranged in a 3D space are overlapped and displayed as one image.

However, the image recorded using the camera of the electronic device 101 may be obtained by projecting points on a three-dimensional space to a two-dimensional image (e.g., a plane), and the electronic device 101 may generate one stitched image 630 by synthesizing the 2D images, as shown in view <6006> of FIG. 6C.

View <6006> of FIG. 6C represents frame images 620-1 to 620-$n$ in which a motion vector MV3 having a smoothing motion vector of the subject 610 is arranged on a 2D plane rather than a 3D space. When each frame image is arranged on a two-dimensional plane, the x, y, and z axes may be corrected such as position adjustment, distortion, and rotation, and a correction value may be calculated according to the corrected coordinate information. The processor 120 may scale the sizes of all frame images based on the correction values of the respective frame images.

In operation 580, the processor 120 may stitch the frame images arranged on a two-dimensional plane according to the movement trajectory of the subject to generate a stitched image of a second size having a range larger than the first size.

For example, the stitched image may have a size having four vertices extending and meeting the outermost boundary lines of frame images in which parts having the same image signal (i.e., pixel data) among the frame images are arranged in an overlapping form in a two-dimensional image (e.g., plane).

The stitched image may include a frame region (i.e., a portion arranged in frame images) in which the frame images 630 are stitched to have pixel data and a blank region (or dark region) in which an image signal is not collected.

According to an embodiment, the processor 120 may fill the display data of the blank region based on pixel data having the frame region as a boundary line between the blank region and the frame region 430a, and may generate a stitched image in which the blank region is filled.

According to some embodiments, the processor 120 may perform an operation of performing image compensation (e.g., noise reduction, resolution adjustment, brightness adjustment, blurring, sharpening, or softening) on the stitched images.

In operation 590, the processor 120 may generate an image file by storing frame images to be reproduced based on the stitched image.

According to an embodiment, the processor 120 may generate an image file by compressing and storing the frame images and the stitched image into one image file.

According to an embodiment, the processor 120 may store the frame images after positioning the stitched image 430 in the first frame (e.g., frame image 1) or the last frame (e.g., frame image n) of the frame images.

According to an embodiment, the processor 120 may store position information of the stitched image, a motion vector of each frame image, and a correction value of each frame image matching the stitched image as metadata in the image file, in addition to the frame images and the stitched image.

According to an embodiment, the processor 120 may store display data to be displayed on the display, based on the stitched image 430 when reproducing the image, generate the display data of the stitched image using pixel data of the frame images 420, and display the display data on the display.

Figure 7:
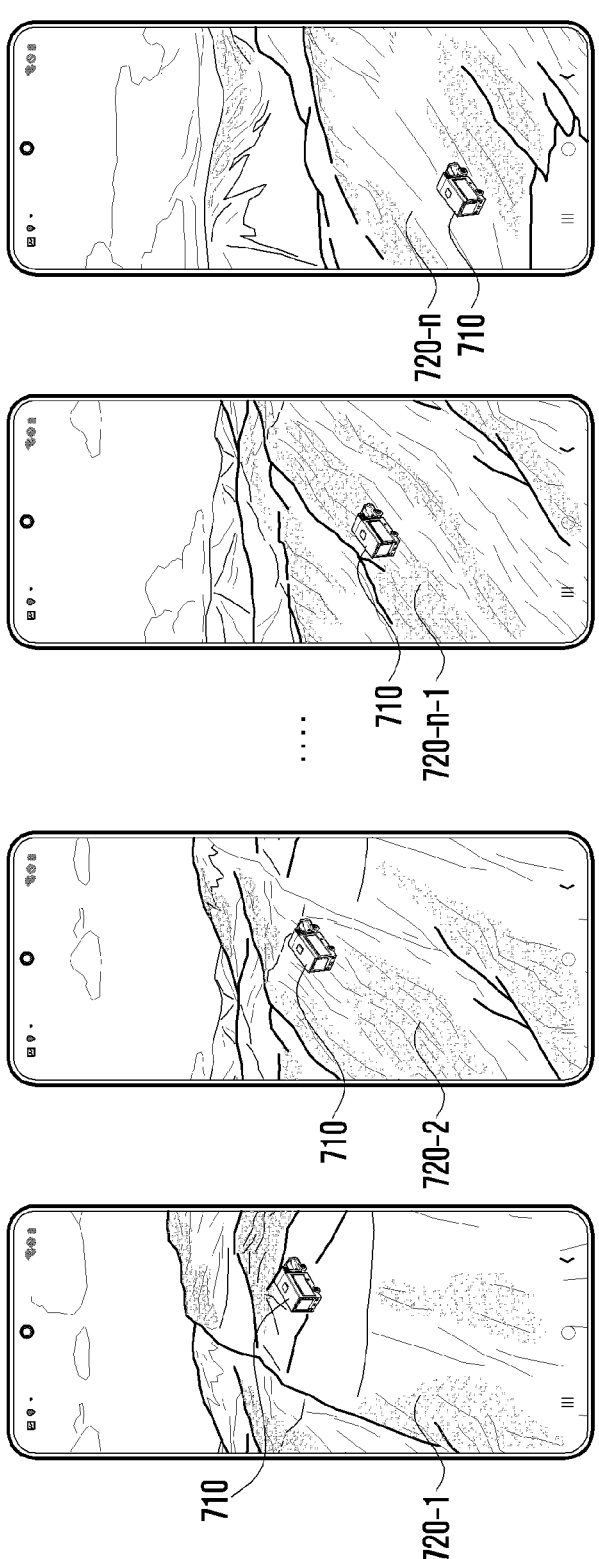
FIG. 7 shows frame images collected when an image is recorded by an electronic device according to an exemplary embodiment.
Figure 8:
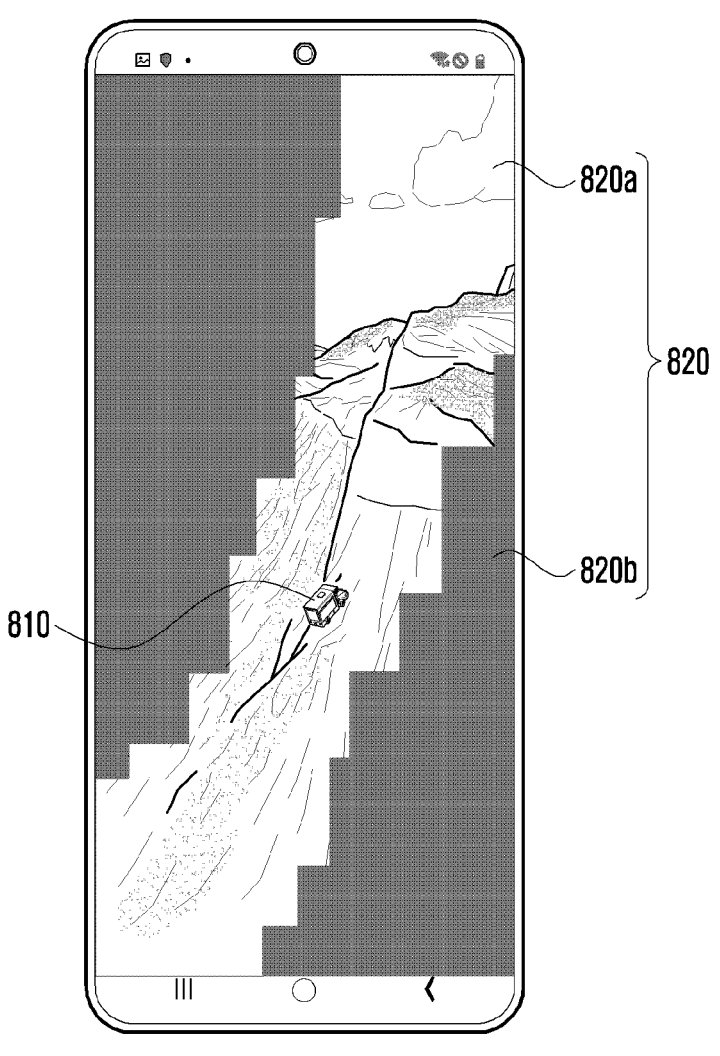
FIG. 8 is a stitched image generated when an image is recorded by the electronic device according to an exemplary embodiment.

FIG. 7 shows frame images collected when an image is recorded by an electronic device according to an exemplary embodiment, and FIG. 8 is a stitched image generated when an image is recorded by the electronic device according to an exemplary embodiment.

Referring to FIGS. 7 and 8, the electronic device 101 according to various embodiments may record an image of a moving subject 710 according to a user's request.

When image capturing starts, the electronic device 101 may display a recorded image including the subject 710 on the display, based on an image signal displayed from the camera. The recorded image displayed on the display may be a preview image.

The electronic device may obtain a plurality of frame images 720-1, 720-2, . . . , 720-n-1, 720-n, accumulated over time by storing the image signal received from the camera in frame units when recording an image. When it is assumed that the first received frame image is 720-1, then the last received frame image may be referred to as 720-n. The frame images may have a first size due to a limitation in the range of the recording angle of view.

The electronic device 101 may use frame images of the first size to generate a stitched image of a second size expressed in a recording range (or angle of view) larger than the first size, and store the stitched image as an image file.

Accordingly, even when the electronic device records the image displayed on the display as shown in FIG. 7, when the recorded image is reproduced, as shown in FIG. 8, the same image 820 as that recorded with a recording range larger than the first size may be played. Through the image 820 of FIG. 8, the user may identify the movement trajectory of the moving subject 810 included in the image on a wider screen.

According to various embodiments, a method of generating a video by recording a moving object of an electronic device may be characterized to include receiving a video signal including an object to obtain a plurality of frame images having a first size, when recording a video, estimating the movement trajectory of the object included in the plurality of frame images, generating a stitched image having a second size larger than the first size by stitching the frame images in which overlapping portions of the video signal are arranged to overlap according to the movement trajectory of the object, and storing the generated stitched image and the plurality of frame images as a video file, and in the storing, the plurality of frame images may be stored to be played based on the generated stitched image.

According to various embodiments, the generating a stitched image may be characterized to include identifying a distance according to a movement trajectory of the object and predicting a size of a stitched image when frame images are synthesized according to the movement trajectory, and scaling the frame images according to the size of the stitched image, and the scaled frame images are stored.

According to various embodiments, the estimating the movement trajectory of the object may be characterized to extract the motion vector of the object motion according to the position of the object for each frame image, verify whether the motion vectors are valid, and estimate the movement trajectory by connecting validated object motions.

According to various embodiments, the verifying whether the motion vectors are valid may further include calculating the amount of change of a motion vector corresponding to the motion of the object corresponding to the movement of the object, and determining whether the amount of change is equal to or greater than a set threshold to verify validity, for each frame image, and excluding (or dropping) motion vector data of the invalid object motion and generating replacement data to replace the invalid object motion, when it is determined that the object motion is invalid, as a result of validation verification, and may be characterized to estimate the movement trajectory of the object, based on the data verified as the valid object motion and the replacement data.

According to various embodiments, the estimating the movement trajectory of the object may further include performing trajectory smoothing with the object motion in which the movement trajectory is smoothed by removing the small shake data of the movement trajectory.

According to various embodiments, the scaling the frame images may be characterized to calculate a correction value for scaling the size of all frame images according to the size of the stitched image, and scale the size of all frame images by applying the correction value.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

a display;

a memory configured to store instructions; and a processor, wherein the instructions, when individually or collectively executed by the processor, cause the electronic device to:

receive a video signal including a subject;

based on receiving the video signal, obtain a plurality of frame images, each frame image of the plurality of frame images having a first size;

estimate a movement trajectory of the subject included in the plurality of frame images;

stitch together the frame images for generating a stitched image in which overlapping portions of the frame images are arranged to overlap according to the movement trajectory of the subject, the stitched image having a second size larger than the first size; and store the stitched image and the plurality of frame images as a video file, wherein the second size of the stitched image is predicted according to the movement trajectory, in the case when frame images are stitched.

2. The electronic device of claim 1, wherein the instructions, when individually or collectively executed by the processor, cause the electronic device to:

store the frame images to be played, based on the stitched image;

call the stitched image of the second size to the display when playing the video file; and display data of the stitched image being generated using pixel data of the frame images.

3. The electronic device of claim 1, wherein the instructions, when individually or collectively executed by the processor, cause the electronic device to:

identify a distance according to the movement trajectory of the subject; and scale the plurality of frame images to fit the second size of the stitched image.

4. The electronic device of claim 1, wherein the stitched image is an image obtained by arranging the plurality of frame images in a virtual two-dimensional or three-dimensional space, and stitching overlapping portions of adjacently arranged frame images.

5. The electronic device of claim 4, wherein the stitched image is generated in a size having four vertices where outermost boundary lines of frame images in which parts having a same image signal among the frame images are arranged in an overlapping form in a two-dimensional image are extended and met.

6. The electronic device of claim 1, wherein the instructions, when individually or collectively executed by the processor, cause the electronic device to:

extract a motion vector of motion of the subject according to a position of the subject for each frame image; and verify whether each motion vector is valid to generate a respective validated object motion, wherein the estimate of the movement trajectory is obtained by connecting the validated object motions.

7. The electronic device of claim 6, wherein the instructions, when individually or collectively executed by the processor, cause the electronic device to calculate an amount of change of the motion vector corresponding to a movement of the subject, and determine whether the amount of change is equal to or greater than a set threshold to verify validity, for each frame image.

8. The electronic device of claim 7, wherein the instructions, when individually or collectively executed by the processor, cause the electronic device to:

identify one or more invalid object motions based on a respective motion vector having an associated amount of change that is less than the set threshold;

exclude motion vector data of the invalid object motion and generate replacement data to replace the invalid object motion; and estimate the movement trajectory of the subject, based on the data verified as the valid object motion and the replacement data.

9. The electronic device of claim 6, wherein the instructions, when individually or collectively executed by the processor, cause the electronic device to perform trajectory smoothing with the object motion in which the movement trajectory is smoothed by removing small shake data of the movement trajectory.

10. The electronic device of claim 3, wherein the instructions, when individually or collectively executed by the processor, cause the electronic device to calculate a correction value for scaling the first size of all frame images according to the second size of the stitched image, and scale the first size of all frame images by applying the correction value.

11. A method of generating a video by recording a moving subject using an electronic device, the method comprising:

receiving, with the electronic device, a video signal including a subject;

based on receiving the video signal, obtaining a plurality of frame images, each frame image of the plurality of frame images having a first size;

estimating a movement trajectory of the subject included in the plurality of frame images;

stitching together the frame images for generating a stitched image in which overlapping portions of the frame images are arranged to overlap according to the movement trajectory of the subject, the stitched image having a second size larger than the first size; and storing, in a memory of the electronic device, the stitched image and the plurality of frame images as a video file, wherein the second size of the stitched image is predicted according to the movement trajectory, in the case when frame images are stitched, wherein, in the storing, the plurality of frame images are stored to be played based on the stitched image.

12. The method of claim 11, wherein the generating a stitched image further comprises:

identifying a distance according to the movement trajectory of the subject; and scaling the frame images according to the second size of the stitched image, wherein the scaled frame images are stored in a memory of the electronic device.

13. The method of claim 11, further comprising:

extracting a motion vector of motion of the subject according to a position of the subject for each frame image;

verifying whether each motion vector is valid; and generating respective validated object motion for each frame image, wherein estimating the movement trajectory comprises connecting validated object motions.

14. The method of claim 13, wherein the verifying whether the motion vectors are valid comprises:

calculating an amount of change of the motion vector corresponding to a movement of the subject, and determining whether the amount of change is equal to or greater than a set threshold to verify validity, for each frame image;

identifying one or more invalid object motions based on a respective motion vector having an associated amount of change that is less than the set threshold;

excluding motion vector data of the invalid object motion and generating replacement data to replace the invalid object motion; and estimating the movement trajectory of the subject, based on the data verified as the valid object motion and the replacement data.

15. The method of claim 11, wherein the estimating the movement trajectory of the subject comprises performing trajectory smoothing with an object motion in which the movement trajectory is smoothed by removing small shake data of the movement trajectory.

16. The method of claim 12, wherein the scaling the frame images comprises calculating a correction value for scaling the first size of all frame images according to the second size of the stitched image, and scaling the first size of all frame images by applying the correction value.

17. A method of generating a video comprising:

obtaining a plurality of frame images with a camera of an electronic device, wherein each frame image has a first size;

identifying a subject in the plurality of frame images;

estimating a movement trajectory of the subject across the plurality of frame images;

generating a stitched image by stitching together at least some of the plurality of frame images based on the estimated movement trajectory, wherein the stitched image has a second size that is greater than the first size; and storing, in a memory of the electronic device, the stitched image and the plurality of frame images as a video file, wherein the plurality of frame images are configured to be played as a video based on the stitched image, wherein the second size of the stitched image is predicted according to the movement trajectory, in the case when frame images are stitched.

18. The method of claim 17, wherein the stitched image is generated by stitching together multiple of the plurality of frame images, wherein frame images having overlapping portions of a video signal are arranged to overlap according to the movement trajectory of the subject.

19. The method of claim 17, further comprising:

extracting a motion vector of motion of the subject according to a position of the subject for each frame image;

verifying whether each motion vector is valid; and generating respective validated object motion for each frame image, wherein estimating the movement trajectory comprises connecting validated object motions.

20. The method of claim 19, wherein the verifying whether the motion vectors are valid comprises:

calculating an amount of change of the motion vector corresponding to a movement of the subject, and determining whether the amount of change is equal to or greater than a set threshold to verify validity, for each frame image;

identifying one or more invalid object motions based on a respective motion vector having an associated amount of change that is less than the set threshold;

excluding motion vector data of the invalid object motion and generating replacement data to replace the invalid object motion; and estimating the movement trajectory of the subject, based on the data verified as the valid object motion and the replacement data.

\* \* \* \* \*